US006503606B1

(12) United States Patent
Sato et al.

(10) Patent No.: US 6,503,606 B1
(45) Date of Patent: Jan. 7, 2003

(54) INK JET RECORDING SHEET

(75) Inventors: Kazuo Sato, Shizuoka (JP); Atsushi Nakamura, Shizuoka (JP)

(73) Assignee: Nisshinbo Industries, Inc., Tokyo (JP)

(*) Notice: Subject to any disclaimer, the term of this patent is extended or adjusted under 35 U.S.C. 154(b) by 0 days.

(21) Appl. No.: 09/618,627

(22) Filed: Jul. 18, 2000

(30) Foreign Application Priority Data

Aug. 23, 1999 (JP) .......................................... 11-235102

(51) Int. Cl.[7] ............................ B32B 27/14; B32B 3/00

(52) U.S. Cl. ....................... 428/195; 428/206; 428/212; 428/313.3; 428/323

(58) Field of Search ................................ 428/195, 206, 428/212, 313.3, 323

(56) References Cited

U.S. PATENT DOCUMENTS 5,340,393 A * 8/1994 Jacobson .................... 106/492
5,372,884 A * 12/1994 Abe et al. ................... 428/331
5,750,200 A * 5/1998 Ogawa et al. .............. 427/361
5,922,395 A * 7/1999 Koike et al. .................. 427/68
5,984,468 A * 11/1999 Malhotra .................... 347/102
6,159,605 A * 12/2000 Hanada et al. ........... 428/423.1
6,197,458 B1 * 3/2001 Kato ............................ 430/7
6,280,658 B1 * 8/2001 Atarashi et al. ............ 252/572

* cited by examiner

*Primary Examiner*—Cynthia H. Kelly
*Assistant Examiner*—B. Shewareged
(74) *Attorney, Agent, or Firm*—Duane Morris LLP

(57) ABSTRACT

The present invention is to provide an ink jet recording sheet which has excellent ink-absorbance, enables the production of a highly precise image and has high surface strength. The ink jet recording sheet comprises providing an ink-receiving layer, containing, as its major components, a binder resin and a pigment, on at least one surface of a substrate, wherein the pigment component includes a hollow filler using a silica-containing inorganic powder as its outer shell layer.

16 Claims, No Drawings

INK JET RECORDING SHEET

BACKGROUND OF THE INVENTION

1. Field of the Invention

The present invention relates to an ink jet recording sheet which has high ink-absorbance, insures the production of a highly precise image and has high surface strength.

2. Description of the Related Art

The ink jet recording system has many advantageous features such as high speed, low noise and easy multi-colorability and it also enables the production of a large-sized image. Moreover it is characterized in that it is largely flexible to recording patterns and requires neither developing nor fixing. The ink jet system, therefore, become widespread rapidly in various fields as methods enabling the preparation of hard copies of, for example, various figures, including characters, and color images.

In the ink jet recording system, fine liquid droplets of ink are jetted at high speed towards a recording sheet from a nozzle and are stuck to the recording surface to record an image, characters and the like. When the recording sheet has low ink absorbance, the stuck ink is diffused, producing bleeding, which results in the preparation of an unclear image and hence no highly precise image having high resolution is obtained. When the ink-absorbing rate of the recording sheet is low, the sheet cannot deal with image printing of a high speed ink jet printer which has been significantly improved in performance in recent years in addition to the above problems.

In view of this situation, various proposals have been made to improve ink-absorbance and the like. As such an ink jet recording sheet, those containing a silica type pigment and a hydrophilic resin in an ink-receiving layer are proposed.

For example, Japanese Patent Application Lid-Open (JP-A) No. 7-329412 proposes an ink jet recording sheet which is improved in ink-absorbance by using usual silica and a hydrophilic resin in the examples. In the sheet of the example according to this proposal, silica is contained in an amount of 2.5 to 4.5 based on 1 of a resin on a solid weight basis. Since silica is contained in an amount more than 2.5 times the weight of the resin, there is the problem that the sheet has weakened boding strength, causing reduced surface strength.

JP-A No. 8-2091 proposes a recording sheet which is provided with a silica gel layer comprising a silica gel and a polyvinyl alcohol on at least one outermost surface of a substrate to improve the ink-absorbance. In its example, a recording sheet containing a silica gel in an amount ranging from 2.5 to 99.0 based on 1 of a resin on a solid weight basis is proposed. The sheet of the example according to this proposal has the problem that reduced surface strength is caused because it contains silica in an amount 2.5 times the weight of the resin like the sheet proposed in the above JP-A No. 7-329412.

Although the reason why a pigment such as silica is contained in an ink-receiving layer is that it is necessary to improve the absorbance of ink primarily as aforementioned, there is the case where it is contained to increase the opacity at the same time. For instance, an ink jet recording sheet for electric decoration must contain a pigment in an increased amount in an ink-receiving layer to set the opacity to 60 to 85%, specifically, it is necessary that the content of a filler is about 2.5 to 10 based on 1 of a binder resin on a solid weight basis. Even in the case of increasing the opacity like the above, the problem that only insufficient surface strength is obtained is posed when a pigment increases.

As outlined above, such a way as to improve ink-absorbance and to increase the opacity by allowing a large amount of a pigment, e.g., silica, to be contained in an ink-receiving layer causes a reduction in the surface strength. It is therefore necessary to improve the ink-absorbance and to increase the opacity by a method other than the above methods.

However, ink jet recording sheets which are limited in the amount of a pigment such as silica and provided with the abilities of improving the ink-absorbance and increasing the opacity have not been proposed so far.

SUMMARY OF THE INVENTION

In light of the above problems of the conventional recording sheets, the present invention has an object of providing a new ink jet recording sheet which has excellent ink-absorbance, enables the preparation of a highly precise image and has high surface strength.

The structure of the present invention which has been made for the purpose of solving the above problems is characterized in that, in an ink jet recording sheet comprising an ink-receiving layer, containing, as its major components, a binder resin and a pigment, on at least one surface of a substrate, wherein the pigment component includes a hollow filler using a silica-containing inorganic powder as its outer shell layer.

In the above structure, as the hollow filler, one whose outer shell has a microporous structure with a pore diameter of 5 to 60 nm may be used.

In the invention, the substrate may be made of a light-transmittable plastic film and the opacity of the entire sheet including the ink-receiving layer according to JIS-P8138 is made to be 60 to 85% whereby the sheet becomes suitable as electric decorative paper.

Specifically, the inventors of the present invention have made earnest studies and, as a result, found that the inclusion of a silica-containing porous inorganic hollow filler in an ink-receiving layer ensures that an increase in the ink-absorbing capacity which cannot be attained by conventional silica can be made and the promotion of the ink-absorbing capacity can be easily attained since the outer shell layer of the hollow filler has a microporous structure, with the result that, as a whole, the ink-absorbance can be improved. Moreover, the inventors have also found that since the above function can be developed by allowing the hollow filler to be contained only in a small amount, the surface strength is improved and even if the hollow filler is contained in a small amount, sufficient masking ability can be obtained. The present invention has been thus completed.

DESCRIPTION OF THE PREFERRED EMBODIMENTS

An embodiment of the ink jet recording sheet of the present invention will be hereinafter explained.

The recording sheet of the present invention has a structure in which an ink-receiving layer is provided on at least one surface of a substrate as described below. An anchor coat layer may be optionally disposed between the substrate and the ink-receiving layer.

As the substrate constituting the recording sheet of the present invention, paper or a plastic film may be used. As the paper, wood-free paper, mid-quality paper, woody paper, imitation paper, art paper, micro-coated paper, tissue paper, chemical pulp paper or fancy paper may be used. As the plastic film, a film of a general thermoplastic resin such as a polyethylene terephthalate (PET), polypropylene, polystyrene or polycarbonate, a foam film of each of these resins including an inorganic powder such as calcium carbonate or a white PET film including titanium oxide and having surface glossiness may be used. As a substrate used, particularly, for electric decorative paper, a light-transmittable plastic film, e.g., a transparent polyester film and a transparent polypropylene film which are commercially available in general, may be used. Among these films, a polyester film is preferably used in view of rigidity and the like.

Next, the ink-receiving layer to be disposed on the substrate includes a binder resin and a pigment as its major components. A cationic compound may be added to the ink-receiving layer as required. The thickness of the ink-receiving layer is 10 to 60 $\mu$m and preferably 20 to 50 $\mu$m in terms of dry film thickness. When the thickness is 10 $\mu$m or more, no bleeding of ink occurs whereas when the thickness is 60 $\mu$m or less, sufficient surface strength can be obtained.

A hollow filler provided with an outer layer made of a silica-containing inorganic powder is contained in a pigment component of the ink-receiving layer. This inorganic follow filler is a particle having an outward appearance like a spherical fine powder and a caved inside. The diameter (outside diameter) of the particle is 1 to 10 mm and preferably 2 to 7 $\mu$m. The surface of the particle is porous and is connected to the inside cavity through a pore. The diameter of the pore is 5 to 60 nm and preferably 20 to 30 nm.

The proportion of such a hollow filler is 0.5 to 2.0 and preferably 0.7 to 1.3 based on 1 of a binder resin on a solid weight basis. When the proportion falls in the above range, sufficient surface strength differing from that of the aforementioned conventional ink jet recording paper is obtained.

Also, since the hollow filler is contained in the ink-receiving layer, the ink-receiving layer has sufficient masking ability. In the case of using, as the substrate, a light-transmittable plastic film as aforementioned, electric decorative paper in which the opacity of the entire sheet including the ink-receiving layer according to Japanese Industrial Standard (JIS) P8138 (Appendix A) is designed to be 60 to 85% and which has sufficient surface strength can be obtained. The opacity so-called here is determined as follows: a sample to which a white standard plate is backed and the same sample to which a black standard plate is backed are measured for each reflectance using a green filter and the ratio (expressed by %) of the latter reflectance to the former reflectance is defined as the opacity. The case where the ratio is 100% is defined as complete opaque.

Next, as the binder resin in the ink-receiving layer, a resin such as a polyvinyl alcohol, gelatin, sodiumalginate, polyvinylpyrrolidone, polyethylene oxide, hydroxyethyl cellulose, polyethyleneimine, polyester, polyurethane, SBR latex, NBR latex, polyvinyl chloride or polyvinyl acetate may be used.

In addition to the above hollow filler, a pigment may be added as required. Examples of such a pigment to be added include inorganic fillers such as calcium carbonate, clay, talc, zeolite, satin white, barium sulfate and kaolin and organic fillers such as a polystyrene, polymethylmethacrylate, polyethylene and urea resin.

Also, it is effective to add a cationic compound in the ink-receiving layer for the purpose of improving the water-resistance of a dye in an ink component. As such a cationic compound, a quaternary ammonium salt type cationic surfactant, amine salt type cationic surfactant or a resin such as polyamidoepichlorohydrin, polyethyleneimine or polyallylamine may be used. The proportion of the cationic compound to be added is 0.1 to 50 and preferably 1 to 30 based on 1 of a binder resin on a solid weight basis. When the proportion is 0.1 or more, the water resistance of a dye is bettered whereas when the proportion is 50 or less, the water resistance of ink is improved.

As the method for the application of the ink-receiving layer, various methods such as well-known reverse roll coating, air-knife coating, gravure coating, blade coating and comma coating may be used.

Examples of the structure of the recording sheet according to the present invention are as aforementioned. Since the recording sheet of the present invention utilizes the physical structure of the hollow filler in the ink-receiving layer, it can be used both in the case of using oil ink and in the case of using aqueous ink. In the recording sheet of the present invention, in the case where a curling phenomenon occurs when the ink-receiving layer is disposed only on one surface of the substrate, a plastic film may be formed appropriately on the other surface of the substrate to prevent curling. A plastic film may also be formed appropriately on the other surface of the substrate to provide the substrate with waterproof finish. Further, a foam plastic film or the like may be formed on the other surface of the substrate to improve the carriage ability of the sheet.

As stated above, in the ink jet recording sheet according to the present invention, ink can be absorbed in a caved portion of the hollow filler in the ink-receiving layer. It is therefore possible to increase the ink-absorbing capacity. Also, since the outer shell layer of the hollow filler has a microporous structure, the ink-absorbing rate is increased and as a whole, the ink-absorbance is improved resultantly. Therefore, such exceptional effects that the sheet is freed of a phenomenon that ink stuck to the recording surface diffuses and bleeds and that the sheet can be used in a high speed ink jet printer can be obtained.

Also, because the recording sheet of the present invention uses the hollow filler, it is unnecessary to add a large amount of a filler to improve the ink-absorbance and the opacity unlike the conventional recording sheets. Even if the proportion of the filler is small, the ink-absorbance and the opacity can be increased. Therefore, high surface strength which cannot be attained by the conventional ink jet recording paper is obtained and the water resistance is also improved.

Further, since the hollow filler in the recording sheet of the present invention has a spherical form, the shape of a dot is reproduced sharply and accurately so that a highly precise image can be obtained.

In addition, because in the recording sheet of the present invention, the inside of the hollow filler is caved, sufficient masking ability of the ink-receiving layer is obtained by adding even a small amount of the hollow filler as aforementioned. Although a transparent substrate is used particularly as electric decorative paper, the opacity of the entire sheet including the ink-receiving layer according to JIS-P8138 can be made to be 60 to 85% even if such a substrate is used.

EXAMPLES

The present invention will be explained by way of examples and comparative examples. In the following explanations, all designations of parts and % indicate parts by weight and weight percentage (wt. %), respectively, unless otherwise noted.

Example 1

| Composition of a coating solution | |
|---|---|
| Polyvinyl alcohol (aqueous 6% solution) (PVA-R11301 manufactured by Kuraray Co., Ltd.) | 145 parts |
| Alumina sol (Alumina sol 200, manufactured by Nissan Chemical Industries, Ltd.) | 17 parts |
| Cationic compound (Polyfix 700, manufactured by Showa Highpolymer Co. Ltd.) | 8 parts |
| Water | 10 parts |
| Silica-containing hollow filler | 10 parts |

(Washin Microcapsule, manufactured by Washin Chemical Industries, Ltd.).

The above components were sufficiently stirred and dispersed to form a coating solution.

Next, an acrylic resin (Movinyl 8020, manufactured by Hoechst Gousei Co., Ltd.) as an adhesive layer was applied to YUPO FPG-80 manufactured by Oji-Yuka Synthetic Paper Co., Ltd. in an amount of 3 g/m$^2$ as a solid and dried to prepare a base substrate. The above coating solution was applied to the adhesive layer in an amount of 4.6 g/m$^2$ as a solid and dried to obtain an ink jet recording sheet of Example 1 of the present invention. At this time, the ratio of the hollow filler to 1 of a binder resin on a solid weight basis was 1.15.

Example 2

An ink jet recording sheet of Example 2 of the present invention was obtained by carrying out application and drying in the same manner as in Example 1 except that the amount of the silica-containing hollow filler in the coating composition was altered from 10 parts to 7 parts. The ratio of the hollow filler to 1 of a binder resin was 0.80 on a solid weight basis.

Example 3

The coating solution of Example 1 was applied to a transparent polyester film (A-8300 (100 $\mu$m), manufactured by Toyobo Co., Ltd.) in an amount of 5.6 g/m$^2$ and dried to obtain electric decorative paper of Example 3 of the present invention. The opacity of this sheet was 74.6%.

Comparative Example 1

A sheet of Comparative Example 1 was obtained by carrying out application and drying in the same manner as in Example 1 except that the silica-containing hollow filler in the coating composition was replaced by synthetic silica (Mizukasil P-78F (average particle diameter: 12 $\mu$m), manufactured by Mizusawa Industrial Chemicals, Ltd.).

Comparative Example 2

An electric decorative paper of Comparative Example 2 was obtained by carrying out application and drying in the same manner as in Example 3 except that the coating solution of Comparative Example 1 was used. The opacity of this sheet was 46.3%.

Comparative Example 3

A sheet of Comparative Example 3 was obtained by carrying out application and drying in the same manner as in Example 1 except that 10 parts of the silica-containing hollow filler in the coating composition was altered to 25 parts of Mizukasil P-78F used in Comparative Example 1. The ratio of synthetic silica to 1 of a binder resin was 2.64 on a solid weight basis.

Using a printer (HP Design Jet 2000CP) manufactured by Hulett Packard Co., a pigment ink was used to carry out printing on each sheet obtained in the above Examples 1 to 3 and Comparative Examples 1 to 3 and the printed condition was evaluated. The results are shown in Table 1.

TABLE 1

| | Ink absorbance | Ink color-developing ability | Surface strength |
|---|---|---|---|
| Example 1 | ○ | ○ | ○ |
| Example 2 | ○ | ○ | ○ |
| Example 3 | ○ | ○ | ○ |
| Comparative Example 1 | X | X | ○ |
| Comparative Example 2 | X | X | ○ |
| Comparative Example 3 | Δ | ○ | Δ |

○: Good
Δ: A tentative recording can be made but its level is regarded as practically questionable.
X: Unsuitable as the recording sheet.

As to Example 3 and Comparative Example 2 which were electric decorative paper, when the paper of Example 3 was irradiated with light from the film side (backface side of the paper) using a fluorescent light, a vivid image appeared on the sheet. On the other hand, the paper of Comparative Example 2 produced uncontrolled image when irradiated with light, showing that it could not be used as the electric decorative paper because it was unsuitable for recording but also had an opacity as low as 46.3%.

What is claimed is:

1. An multi-layer ink jet recording sheet comprising only one layer, containing, as its major components, a binder resin and a pigment, on at least one surface of a substrate, wherein said pigment component includes a hollow filler using a silica-containing inorganic powder as its shell layer.

2. An ink jet recording sheet according to claim 1, wherein the shell of the hollow filler has a microporus structure with a pore diameter of 5 to 60 nm.

3. An ink jet recording sheet according to claim 1, wherein the substrate is made of a light-transmittable plastic film and the opacity of the entire sheet including said one layer according to JIS-P8138 is 60% to 85%.

4. An ink recording sheet according to claim 2, wherein the substrate is made of a light-transmittable plastic film and the opacity of the entire sheet including said one layer according to JIS-P8138 is 60 to 85%.

5. The ink jet recording sheet of claim 1, wherein the hollow filler has a spherical shape.

6. The ink jet recording sheet of claim 5, wherein the hollow filler has an outside diameter of about 1 to 10 $\mu$m.

7. The ink jet recording sheet of claim 1, wherein said one layer includes a cationic compound.

8. The ink jet recording sheet of claim 1, wherein said one layer has a thickness in the range of about 10 to 60 $\mu$m.

9. The ink jet recording sheet of claim 1, wherein the proportion of the hollow filler is about 0.5 to 2.0 of a binder resin by parts on a solid weight basis.

10. The ink jet recording sheet according to claim 1, wherein said one layer includes one of a quaternary ammonium salt-type cationic surfactant, an amino salt-type cationic surfactant or a resin.

11. The ink jet recording sheet of claim 7, wherein the proportion of the cationic compound is about 0.1 to 50 of the binder resin by parts on a solid weight basis.

12. The ink jet recording sheet of claim 1, wherein an anchor coat layer is disposed between the substrate and said one layer.

13. In an multilayer ink jet recording sheet having a single layer including a binder resin and a pigment on at least one surface of a substrate, the improvement wherein the pigment includes a sphere shaped hollow filler.

14. The ink jet recording sheet of claim 13, wherein the sphere shaped hollow filler comprises an shell layer of a silica-containing inorganic powder.

15. The ink jet recording sheet of claim 14, wherein the shell layer of the hollow filler has a microporous structure with a pore diameter of about 5 to 60 nm.

16. The ink jet recording sheet of claim 1, wherein a plastic film is disposed on a second surface of the substrate.

* * * * *